No. 750,729. PATENTED JAN. 26, 1904.
E. O. STORRS.
AUTOMATIC CHECK ROW CORN PLANTER.
APPLICATION FILED OCT. 8, 1903.
NO MODEL.

Witnesses:
L. L. Leibrock.
R. H. Orwig.

Inventor: Eugene O. Storrs,
By Thomas G. Orwig, Attorney.

No. 750,729.

Patented January 26, 1904.

UNITED STATES PATENT OFFICE.

EUGENE O. STORRS, OF WINTERSET, IOWA.

AUTOMATIC CHECK-ROW CORN-PLANTER.

SPECIFICATION forming part of Letters Patent No. 750,729, dated January 26, 1904.

Application filed October 8, 1903. Serial No. 176,324. (No model.)

*To all whom it may concern:*

Be it known that I, EUGENE O. STORRS, a citizen of the United States, residing at Winterset, in the county of Madison and State of Iowa, have invented a new and useful Automatic Check-Row Corn-Planter, of which the following is a specification.

My object is to provide a simple mechanism for automatically actuating a rock-shaft in a corn-planter at regular intervals of space as the planter is advanced and as required to drop seeds at regular distances apart to produce check-rows.

My invention consists in the arrangement and combination of parts with the carriage-frame of a planter, as hereinafter set forth, pointed out in my claims, and illustrated in the accompanying drawings, in which—

Figure 1:
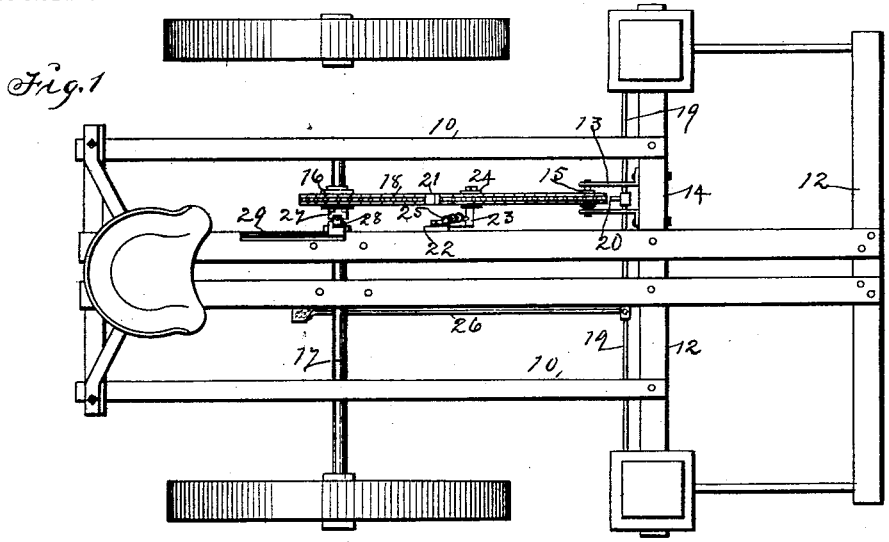
Figure 2:
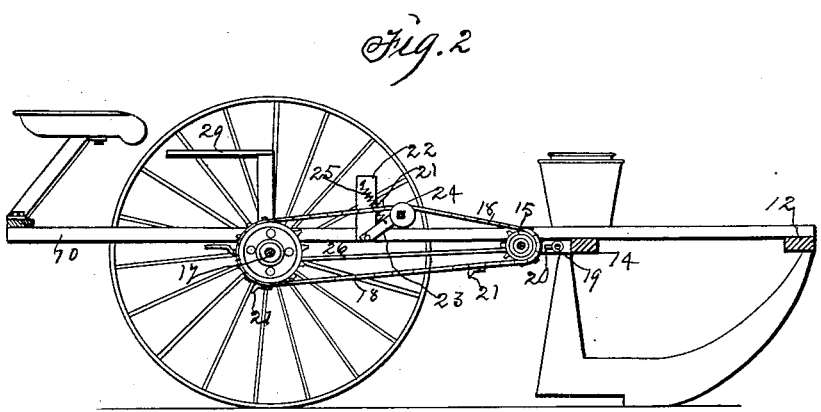

Figure 1 is a top view of the runners and carriage and shows the positions of the different parts of my operative mechanism relative to each other and the carriage. Fig. 2 is a central sectional view of the carriage and shows the operative parts in a side view or elevation.

The numeral 10 designates a carriage-frame, and 12 the runner-frame. They are connected as shown or in any suitable way and may vary in form, as desired. A frame 13, adapted to serve as a wheel-bearer, is fixed to the bench or cross-bar 14 on the runner-frame to extend rearward, and a sprocket-wheel 15 is mounted therein, and a corresponding sprocket-wheel 16 is mounted on the rotatable carriage-axle 17, and a chain 18 connects the two sprocket-wheels as required to transmit motion from the axle to the front sprocket-wheel 15. A rock-shaft 19 is mounted on the runner-frame for operating seed-dropper mechanism (not shown) and has a lug 20 that in its normal position projects rearward and is adapted to be engaged by strikers 21, formed integral with chain-links. There are three of the strikers equidistant from each other. Each revolution of the carriage-wheels and the sprocket-wheel 16 actuates the chain 18 as required to cause the strikers 21 to successively contact with the lug 20 as required to rock the shaft 19 to drop seeds at regular intervals of space as the planter is advanced in the field.

A post 22 is fixed to the carriage-frame, and a pulley-bearer 23, carrying a pulley 24, is pivotally connected with said post and a coil-spring 25, fixed to the post, and the pulley-bearer normally holds the pulley up to support and tighten the chain 18 on the sprocket-wheels 15 and 16.

An arm 26 is fixed to the rock-shaft 19 and extended rearward, so a person on the driver's seat can by foot-pressure turn the rock-shaft, so that the lug 20 will project downward and out of reach of the strikers 21, as required to make the device inoperative when turning about at the end of a field or whenever necessary.

The sprocket-wheel 16 is loosely mounted on the axle 17 and has a clutch member 27 on the end of its hub adapted to engage a mating clutch member 28, fixed on the axle, in such a manner that the wheel 16 can be moved, by means of a hand-lever 29, to disconnect the clutch members as required to stop the operation of the sprocket wheels and chain whenever desired.

I am aware rock-shafts and endless chains have been used in combination with seed-valves; but in no instance has an endless chain having fixed strikers been combined with a sprocket-wheel on a rotating carriage-axle and a sprocket-wheel mounted in an auxiliary frame fixed to the bench of the runner-frame to cause the fixed strikers on the chain to intermittently contact direct with a lug on a rock-shaft in the simple manner shown and described.

Having thus described the object of my invention and its construction, application, and operation, its practical utility will be obvious to persons familiar with the art to which it pertains.

What I claim as new, and desire to secure by Letters Patent, is—

1. In a corn-planter attachment, a frame for a wheel-bearer fixed to the runner-frame, a sprocket-wheel mounted in said wheel-bearer frame, a sprocket-wheel mounted on the carriage-axle, a chain, having fixed strikers projected vertically and adapted to engage a lug on a rock-shaft, and a rock-shaft having a lug adapted to be engaged by the strikers on the chain, and an arm fixed to the rock-shaft to extend rearward arranged and combined to operate in the manner set forth for the purposes stated.

2. In a corn-planter attachment, a frame for a wheel-bearer fixed to the runner-frame, a sprocket-wheel mounted in said wheel-bearer frame, a sprocket-wheel mounted on the carriage-axle, a chain having fixed strikers projected vertically and adapted to engage a lug on a rock-shaft and a rock-shaft having a lug adapted to be engaged by the strikers on the chain, an arm fixed to the rock-shaft to extend rearward and an automatic chain tension device, arranged and combined to operate in the manner set forth for the purposes stated.

3. An automatic attachment for corn-planters comprising a sprocket-wheel having a fixed clutch member on the end of its hub and a mating clutch member adapted to be fixed on a rotating carriage-axle, a wheel-bearer frame fixed to the runner-frame of a planter and a sprocket-wheel mounted in said frame, a chain for connecting the sprocket-wheels and strikers fixed to chain-links, to project vertically a rock-shaft mounted on the runner-frame and provided with a lug projecting at right angles therefrom, an arm fixed to the rock-shaft to extend rearward to be manually operated, an automatic chain-tightener and means for connecting and disconnecting the clutch members, to be applied and operated in the manner set forth for the purposes stated.

EUGENE O. STORRS.

Witnesses:
  A. H. STILL,
  THOMAS G. ORWIG.